(12) United States Patent
Jiang et al.

(10) Patent No.: US 10,648,049 B2
(45) Date of Patent: May 12, 2020

(54) HEAT TREATED HEAVY WEIGHT DRILL PIPE

(71) Applicant: Wellbore Integrity Solutions LLC, Houston, TX (US)

(72) Inventors: Wenhui Jiang, Pearland, TX (US); Fengxiao Liu, Houston, TX (US); Alan W. Lockstedt, Magnolia, TX (US); Doyle Wayne Brinegar, Conroe, TX (US)

(73) Assignee: Wellbore Integrity Solutions LLC, Houston, TX (US)

( * ) Notice: Subject to any disclaimer, the term of this patent is extended or adjusted under 35 U.S.C. 154(b) by 788 days.

(21) Appl. No.: 14/685,847

(22) Filed: Apr. 14, 2015

(65) Prior Publication Data
US 2016/0305194 A1    Oct. 20, 2016

(51) Int. Cl.
*C21D 9/50*    (2006.01)
*C21D 9/08*    (2006.01)
(Continued)

(52) U.S. Cl.
CPC ............. *C21D 1/00* (2013.01); *B23K 9/0282* (2013.01); *B23K 9/23* (2013.01); *B23K 20/129* (2013.01);
(Continued)

(58) Field of Classification Search
CPC . C21D 1/00; C21D 6/00; C21D 6/001; C21D 6/002; C21D 6/004; C21D 6/005;
(Continued)

(56) References Cited

U.S. PATENT DOCUMENTS

| | | | | |
|---|---|---|---|---|
| 2,257,335 A | * | 9/1941 | Evans | B23K 11/0935 |
| | | | | 219/100 |
| 3,997,374 A | * | 12/1976 | Dill | C21D 9/50 |
| | | | | 148/520 |

(Continued)

FOREIGN PATENT DOCUMENTS

| | | |
|---|---|---|
| CN | 1050409 A | 4/1991 |
| CN | 1081106 C | 3/2002 |

(Continued)

OTHER PUBLICATIONS

DP-Master Heavy Weight Drill Pipe, public release Aug. 12, 2011, 6 pages. (Year: 2011).*

*Primary Examiner* — Vanessa T. Luk
(74) *Attorney, Agent, or Firm* — Hubbard Johnston, PLLC

(57) ABSTRACT

A heavy weight drill pipe may include a tube body formed of AISI 1340 alloy steel, and first and second tool joints at respective ends of the tube body, and which are formed of an AISI 41XX series alloy steel. The first and second tool joints may be welded to the tube body at a weld line within a weld region. A Charpy impact toughness at the weld line or surrounding weld region may be least 12 ft-lbs. (16.5 N-m). Yield and tensile strengths at the weld line or weld region may be at least 65 ksi (448.0 MPa) and at least 106 ksi (731.0 MPa), respectively. Material properties at the weld line or weld region may be achieved by heat treating after welding. Heat treating may include austenitizing, quenching, and tempering the weld line and/or the surrounding weld region.

20 Claims, 5 Drawing Sheets

(51) Int. Cl.
*C21D 1/00* (2006.01)
*C21D 6/00* (2006.01)
*C21D 1/26* (2006.01)
*C21D 1/56* (2006.01)
*B23K 9/23* (2006.01)
*B23K 20/227* (2006.01)
*B23K 31/02* (2006.01)
*E21B 17/16* (2006.01)
*B23K 9/028* (2006.01)
*B23K 20/12* (2006.01)
*B23K 103/04* (2006.01)
*B23K 101/06* (2006.01)

(52) U.S. Cl.
CPC ............ B23K 20/227 (2013.01); B23K 31/02 (2013.01); C21D 1/26 (2013.01); C21D 1/56 (2013.01); C21D 6/00 (2013.01); C21D 9/085 (2013.01); C21D 9/505 (2013.01); E21B 17/16 (2013.01); *B23K 2101/06* (2018.08); *B23K 2103/04* (2018.08); *C21D 2251/04* (2013.01)

(58) Field of Classification Search
CPC .......... C21D 6/007; C21D 6/008; C21D 8/10; C21D 8/105; C21D 9/08; C21D 9/085; C21D 9/14; C21D 9/50; C21D 9/505; C21D 2221/00; C21D 2221/01; C21D 2221/02; C21D 2251/00; C21D 2251/04; B23K 9/0052; B23K 9/028; B23K 9/0282; B23K 9/0284; B23K 9/0286; B23K 9/0288; B23K 9/23; B23K 9/232; B23K 11/004; B23K 11/065; B23K 11/066; B23K 11/093; B23K 11/0935; B23K 11/20; B23K 11/0073; B23K 13/015; B23K 26/0006; B23K 26/282; B23K 2201/04; B23K 2201/06; B23K 2201/08; B23K 2201/10; B23K 2203/02; B23K 2203/04; B23K 2203/18; B23K 20/129; B23K 20/22; B23K 20/227; B23K 31/02; B23K 31/027
See application file for complete search history.

(56) References Cited

U.S. PATENT DOCUMENTS

| | | | | |
|---|---|---|---|---|
| 4,001,054 | A | * | 1/1977 | Makepeace .............. C21D 9/08 138/155 |
| 4,087,593 | A | * | 5/1978 | Phelps ................... B60K 17/22 148/529 |
| 4,181,845 | A | | 1/1980 | Bolton |
| 4,331,280 | A | | 5/1982 | Terabayashi et al. |
| 4,416,476 | A | | 11/1983 | Garrett |
| 4,460,202 | A | | 7/1984 | Chance et al. |
| 4,771,811 | A | | 9/1988 | DeCell et al. |
| 6,012,744 | A | | 1/2000 | Wilson et al. |
| 2009/0224024 | A1 | | 9/2009 | Kawaura et al. |
| 2010/0047606 | A1 | | 2/2010 | Seidinger |
| 2012/0228034 | A1 | | 9/2012 | Roussie et al. |
| 2013/0313025 | A1 | * | 11/2013 | Aung ..................... E21B 17/10 175/325.1 |
| 2014/0103643 | A1 | | 4/2014 | Jiang et al. |

FOREIGN PATENT DOCUMENTS

| | | | |
|---|---|---|---|
| CN | 101649376 A | | 2/2010 |
| GB | 2026044 A | * | 1/1980 ............ C21D 1/667 |

* cited by examiner

HEAT TREATED HEAVY WEIGHT DRILL PIPE

CROSS-REFERENCE TO RELATED APPLICATIONS

N/A

BACKGROUND OF THE DISCLOSURE

A wellbore may be formed within a subterranean formation to facilitate the extraction of natural resources (e.g., natural gas, crude oil, water, etc.) or for a variety of other purposes. A drillstring within the wellbore may include a bottomhole assembly positioned towards the bottom of the wellbore. The drillstring may include one or more drill collars or other drill pipes to which the drill collar may be coupled. Tubular bodies of the drill collars may be relatively thick-walled and stiff, while tubular bodies of other drill pipes may be relatively thin-walled, more flexible, and lighter weight. In some cases, transition drill pipe, also known as heavy weight drill pipe, may be part of the drillstring. The heavy weight drill pipe may have intermediate wall thickness and stiffness characteristics to provide a transition between a relatively stiff drill collar and a more flexible drill pipe of the drillstring. The heavy weight drill pipe may alleviate impact loading and bending stresses on the drill pipe (particularly those closest to the drill collar).

SUMMARY

Some embodiments of the present disclosure are directed to a drill pipe that includes a tube body formed of AISI 1340 alloy steel, a first tool joint at a first end of the tube body, and a second tool joint at a second end of the tube body. The first and second tool joints may be formed of an AISI 41XX series alloy steel. The first and second tool joints may be welded to the tube body, with a weld line and a surrounding weld region between the respective tool joint and the tube body. The weld line, the surrounding weld region, or both, may be heat treated to have a Charpy impact toughness of at least 12 ft-lbs. (16.5 N-m) at −4° F. (−20° C.). In at least some embodiments, the drill pipe may be heavy weight drill pipe.

In some embodiments, the Charpy impact toughness at the weld line and/or in the surrounding weld region may be at least 15 ft-lbs. (20.5 N-m), 20 ft-lbs. (27.0 N-m), 24 ft-lbs. (32.5 N-m), 25 ft-lbs. (34.0 N-m), or 30 ft-lbs. (40.5 N-m) at −4° F. (−20° C.).

Some embodiments of the present disclosure are directed to a heavy weight drill pipe that includes a tube body formed of AISI 1340 alloy steel, a first tool joint at a first end of the tube body, and a second tool joint at a second end of the tube body. The first and second tool joints may be formed of an AISI 41XX series alloy steel. The first and second tool joints may be welded to the tube body, with a weld line and surrounding weld region between the respective tool joint and the tube body. The weld line, the surrounding weld region, or both may have a yield strength of at least 65 ksi (448.0 MPa), a tensile strength of at least 106 ksi (731.0 MPa), or both.

Some embodiments of the present disclosure are directed to methods of manufacturing heavy weight drill pipe. Such methods may include welding a first tool joint formed of AISI 41XX series alloy steel to a first end of a tube body formed of AISI 1340 alloy steel. A second tool joint formed of AISI 41XX series alloy steel may be welded to a second end of the tube body. Weld lines and/or weld regions located between the tube body and respective first and second tool joints may be heat treated. The heat treatment may include austenitizing the weld line and/or the surrounding weld region by heating to a temperature of at least 1,550° F. (843.5° C.), quenching, and tempering by heating to a temperature of at least 1,200° F. (649.0° C.).

This summary is provided to introduce a selection of concepts that are further described below in the detailed description. This summary is not intended to identify specific features of the claimed subject matter, nor is it intended to be used as an aid in limiting the scope of the claimed subject matter. Indeed, additional features of embodiments of the disclosure will be set forth in the description which follows, and in part will be logical from the description, or may be learned by the practice of such embodiments. The features of such embodiments may be realized and obtained by means of the instruments and combinations particularly pointed out in the description and/or the appended claims. These and other features will become more fully apparent from the following description and appended claims, or may be learned by the practice of such embodiments as set forth hereinafter.

BRIEF DESCRIPTION OF THE DRAWINGS

In order to describe the manner in which features of the disclosure can be obtained, a more particular description will be rendered by reference to specific embodiments, some of which are illustrated in the appended drawings. For better understanding, the like elements have been designated by like reference numbers throughout the various accompanying figures. While some of the drawings may be schematic or exaggerated representations of concepts, at least some of the drawings may be drawn to scale for some but not each embodiment contemplated herein. Understanding that these drawings depict some example embodiments, the embodiments will be described and explained with additional specificity and detail through the use of the accompanying drawings in which:

FIG. 1-2 is a cutaway, close up view of an example drillstring that may include one or more heavy weight drill pipes, according to one or more embodiments of the present disclosure;

FIG. 2 is an isometric view of a heavy weight drill pipe, according to one or more embodiments of the present disclosure;

FIG. 3-1 is a side view of a heavy weight drill pipe prior to welding of tool joints to a tube body, according to one or more embodiments of the present disclosure;

FIG. 3-2 is a side view of the heavy weight drill pipe of FIG. 3-1 once the tool joints have been welded to the tube body, according to one or more embodiments of the present disclosure.

DETAILED DESCRIPTION

Some embodiments of the present disclosure relate generally to drill pipe. More particularly, some embodiments of the present disclosure relate to heavy weight drill pipe. More particularly, still, some embodiments of the present disclosure generally relate to heavy weight drill pipes formed, machined, or otherwise manufactured using an alloy steel for the tube body (e.g., AISI 1340), and providing higher impact toughness characteristics than would otherwise be provided, particularly in the region of an interface between the tube body and tool joints at either end of the tube body.

In some embodiments, tube bodies of heavy weight drill pipes can be formed of alloy materials, such as AISI 4140 or other AISI 41XX series alloy steels, which provide a relatively higher level of strength and/or toughness, although such materials are significantly more expensive than lower alloyed steels. Some embodiments of the present disclosure relate to heavy weight drill pipes and related methods of manufacture where the tube body is formed from a lower alloy steel (e.g., AISI 1340 alloy steel) while providing relatively higher levels of strength, toughness, or both.

Figure 1:
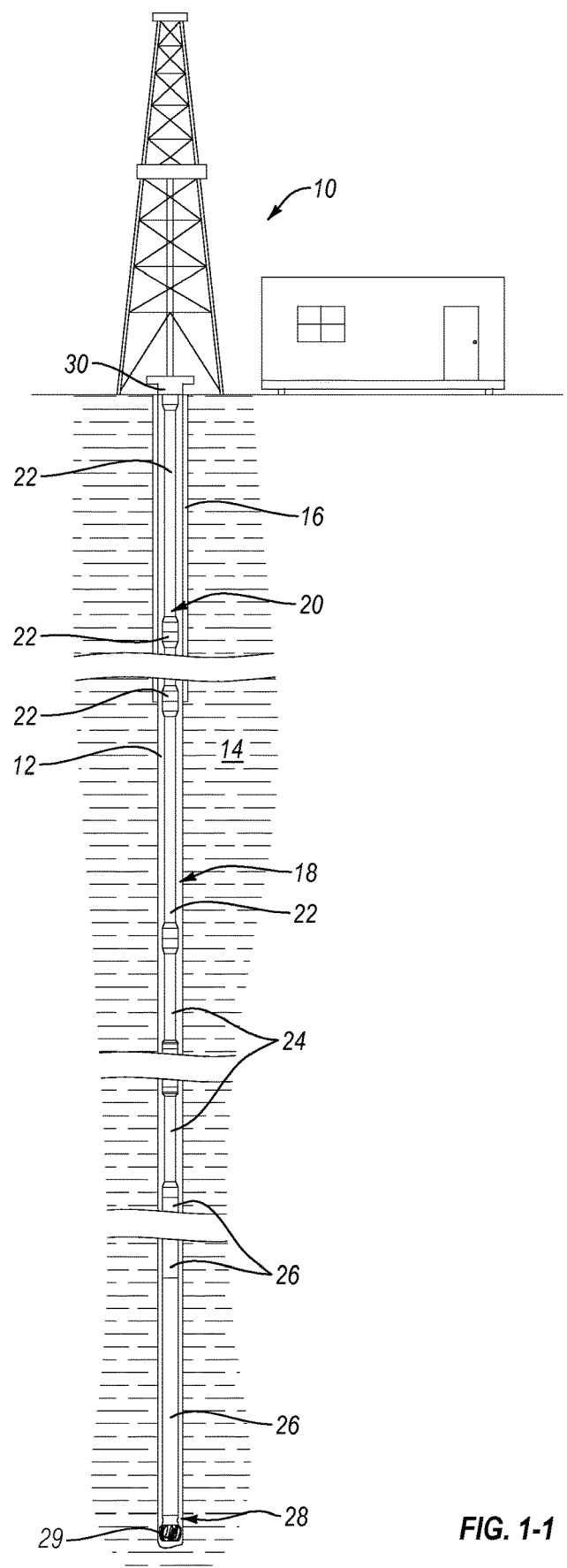
FIG. 1-1 is a schematic representation of a drilling system with a drillstring including one or more heavy weight drill pipes in a wellbore, according to one or more embodiments of the present disclosure.

FIG. 1-1 schematically illustrates a drilling system 10 associated with a wellbore 12. The wellbore 12 extends downward into a formation 14. The wellbore 12 may include a cased portion 16 that may reinforce the wellbore 12 against fluid pressure of the formation 14, provide structural integrity to the wellbore 12, or perform other functions. The length or even presence of the cased portion 16 may vary depending on the formation 14 through which the wellbore 12 is drilled. If present, a full or partial length of the wellbore 12 may be cased. The cased portion 16 may also change in size. For instance, casing (including liners) of different diameters may be installed. Where multiple sizes of casing are installed, the casing may decrease in size toward the distal end of the wellbore 12. In some embodiments, a full or partial portion of the wellbore 12 may be uncased, which "openhole" portion 18 may include no casing lining the wellbore 12.

A drillstring 20 may include one or more tubulars. The tubulars of the drillstring 20 may include one or more drill pipes 22, one or more heavy weight drill pipes 24, one or more drill collars 26, other tubulars, or any combination of the foregoing. The drillstring 20 may also include a bottomhole assembly 28 coupled to the plurality of tubulars, and potentially including one or more tubulars. The drillstring 20 may transmit torque from a torque transmitting device (e.g., a kelly 30, a top drive, etc.) to the bottomhole assembly 28. In some embodiments, the bottomhole assembly 28 may include a downhole tool. The bit 29 may be configured to remove material from the formation 14. Other downhole tools may be used instead of, or in addition to, the bit 29. For example, other downhole tools may include, but are not limited to, a section mill, a reamer, a window mill, a junk mill, a casing mill, a circulation sub, a debris catcher, a jar, a whipstock, an anchor, fracking tools, a plug, a shock/vibration suppressor, fishing tools, remedial tools, a tractor, or a vibration conveyance device. A variety of sensors or data collection modules may be provided for monitoring and measuring the progress of drilling (or other downhole operations), the properties of the system 10, the properties of the formation 14, and the like.

Figures 1, 2:
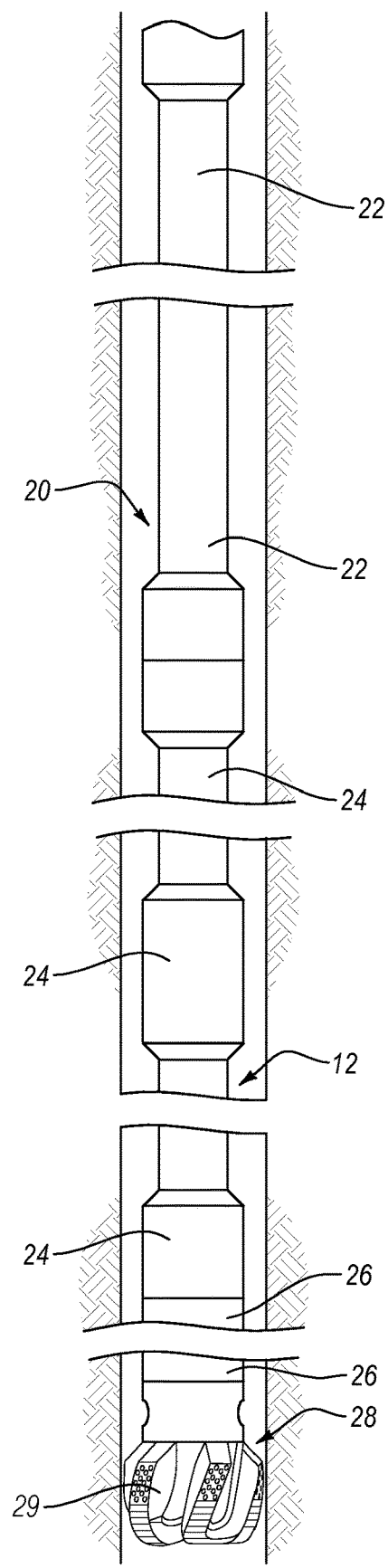
Figure 2:
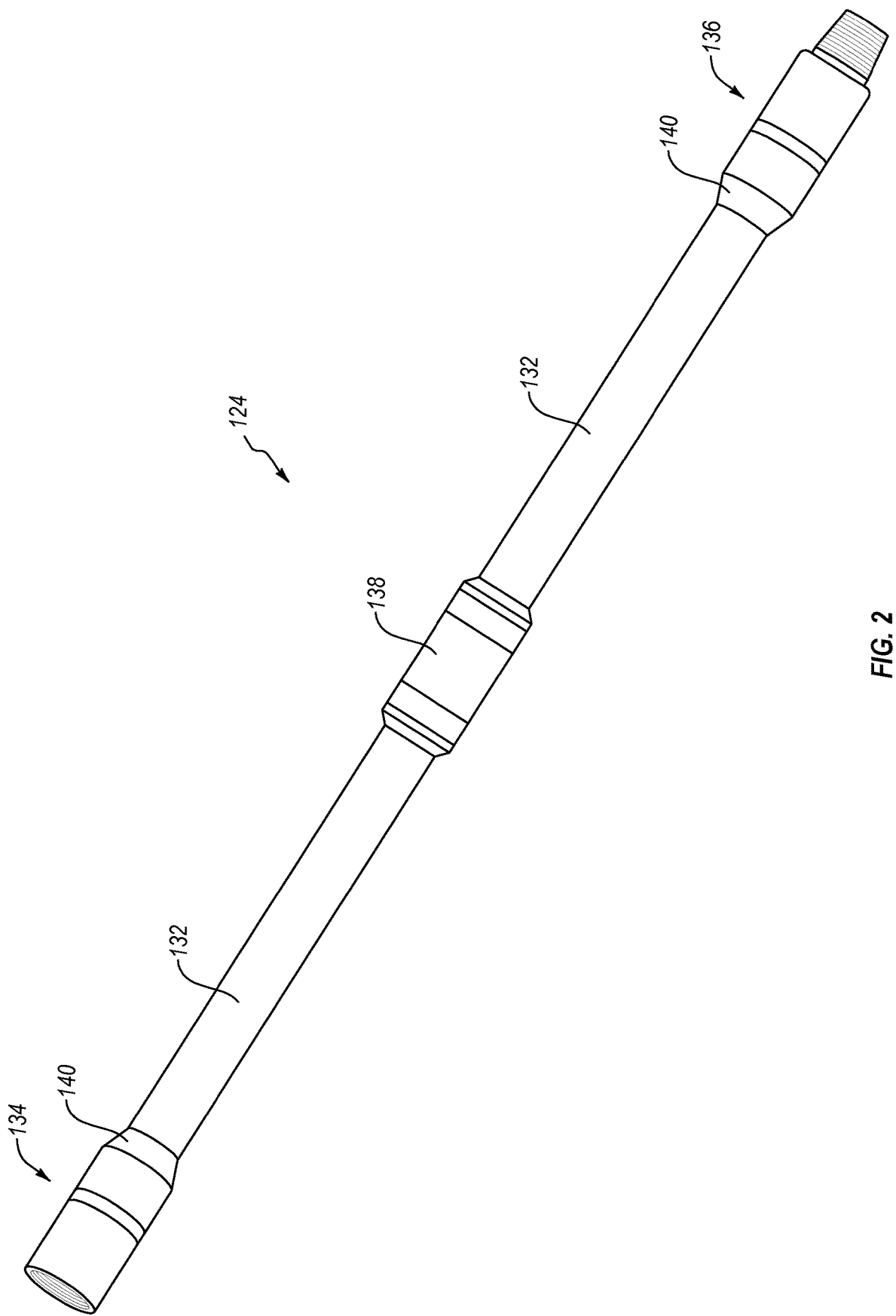

One or more heavy weight drill pipes 24 may be positioned in the wellbore 12 and along the drillstring 20. In some embodiments, the one or more heavy weight drill pipes 24 may be positioned axially between the one or more drill collars 26 and the one or more drill pipes 22. While the one or more heavy weight drill pipes 24 may be positioned downhole of the one or more drill pipes 22 and uphole of the one or more drill collars 26, in other embodiments the drillstring 20 may have other configurations. For instance, the one or more heavy weight drill pipes 24 may be positioned uphole of one or more drill pipes 22 and/or downhole of one or more drill collars 26. In the same or other embodiments, the one or more drill collars 26 may be positioned uphole of one or more of the drill pipes 22. The tubulars of the drill string 20 (e.g., drill pipes 22, heavy weight drill pipes 24, and drill collars 26) may be coupled directly together, end-to-end, or they may be coupled indirectly together with one or more intermediate tools or components. FIG. 1-2 shows a close up view of the drillstring 20 with multiple tubulars coupled together, while FIG. 2 shows an example of a single heavy weight drill pipe 124.

The drill collars 26 (e.g., tube bodies of the drill collars 26) may have increased wall thickness relative to the heavy weight drill pipe 24 and the drill pipe 22). By way of example, a drill collar 26 having an outside diameter of 6.50 in. (16.5 cm) may have an inside diameter of 2.25 in. (5.7 cm), and a wall thickness of 2.13 in. (5.4 cm). Such a drill collar may weigh, for example, 100 lbs/ft. (148.82 kg/m). Having such characteristics, the drill collars 26 may be configured to endure stress and vibration associated with the bottomhole assembly 28, while also providing desired weight-on-bit to aid the bit 29 in drilling through the formation 14. Drill pipe 22 may have a reduced wall thickness and lower weight per length value relative to the drill collars 26 and/or the heavy weight drill pipe 24. For example, drill pipe 22 having an outside diameter of 4.50 in. (11.4 cm) and a wall thickness of 0.34 in. (0.9 cm) may have a weight per length value of 16.60 lbs/ft. (24.7 kg/m). At least in part due to these characteristics, drill pipe 22 may be more flexible, but also more susceptible to failure due to bending stresses and other forces transmitted from the bottomhole assembly 28 or other tools coupled to the drillstring 20. The heavy weight drill pipe 24 may have intermediate wall thickness and weight per length characteristics, so as to be configured to provide a transition between the relatively heavy, stiff drill collar 26 and the relatively lighter, more flexible drill pipe 22. At least in part due to these intermediate characteristics, the heavy weight drill pipe 29 may withstand impact loading and bending stresses, thereby minimizing or even preventing fatigue damage and premature failure of the drillstring 20.

Referring to FIG. 2, a heavy weight drill pipe 124 may include a tube body 132. In some embodiments, the tube body 132 may be seamless. For instance, the tube body 132 may be formed from bar or tube stock and lack axial, circumferential, helical, or other seams. According to the same or other embodiments, the heavy weight drill pipe 124 may include a first tool joint 134 at a first end of the tube body 132, and a second tool joint 136 at an opposite, second end of the tube body 132. The first and second tool joints 134 and 136 may be welded to the tube body 132, e.g., by friction welding, inertia welding, submerged arc welding, or other suitable welding process. As illustrated, the tube body 132 may include an upset 138, which may optionally be centered along the tube body 132. In some embodiments, the upset 138 may aid in reducing wear on a center or other intermediate section of the tube body 132. In some embodiments, the tube body 132 may include a helical groove in addition to, or instead of, the upset 138.

Any of various types of hardbanding may be applied to one or more portions of the heavy weight drill pipe 124 (e.g., around the upset 138 and/or the first and second tool joints 134, 136) to aid in reducing wear. In some embodiments, the hardbanding may be magnetic, while in other embodiments the hardbanding may be non-magnetic. The hardbanding may include tungsten carbide or other metal carbides in some embodiments to provide a wear resistant surface.

Tapered portions 140 of the heavy weight drill pipe 124 may be provided between the tube body 132 and the first and/or second tool joints 134, 136. In some embodiments, the second tool joint 136 may include a male threaded joint, referred to as a pin, and the first tool joint 134 may include a corresponding female threaded joint, referred to as a box, so that multiple tubulars may be joined to one another end-to-end using the box and pin tool joints. In some embodiments, the first and second tool joints 134, 136 may both be box joints or both be pin joints. For background purposes, additional details of welding techniques for attachment of the first and second tool joints, and compositional characteristics of AISI 41XX series alloy steels are disclosed in U.S. Patent Publication No. 2014/0103643, herein incorporated by reference in its entirety for any purpose.

The tapered portion 140 may have any suitable angle of inclination relative to the longitudinal axis of the tube body 132. Relatively shallower angles of inclination (i.e., closer to 0°) may, in some embodiments, be more resistant to hanging up in a dogleg or other bend of the wellbore. In some embodiments, the incline angle may be within a range including lower and/or upper limits that include any of 3°, 5°, 8°, 10°, 15°, 20°, 25°, 30°, 35°, 40°, 45°, or any value or range of values therebetween. In other embodiments, the angle may be less than 3° or greater than 45°. In some embodiments, the angle of incline may be 18° on the pin side of the heavy weight drill pipe 124. In some embodiments, the angle of incline may be 35° on the box side of the heavy weight drill pipe 124. Use of a relatively higher angle of incline may result in the use of less material, as the length of the taper can be shorter due to the greater incline, although greater incline angles can be more prone to hanging up or otherwise becoming stuck in the wellbore. In some embodiments, the angle of incline on the box end and pin end are the same, e.g., both may be 18°.

Table 1 provides dimensional data for several example heavy weight drill pipe configurations. Heavy weight drill pipes may be provided in lengths of 30.5 ft. (9.30 m), referred to as "range 2". The heavy weight drill pipes can also be manufactured in lengths of 46 ft. (14.02 m), referred to as "range 3". Of course, any other desired length may be provided.

TABLE 1

| Nominal Size in. (cm) | Inside Diameter in. (cm) | Wall Thickness in. (cm) | Weight Including Tube Body and Tool Joints lbs/ft. (kg/m) |
|---|---|---|---|
| 3.50 (8.89) | 2.25 (5.72) | 0.63 (1.59) | 23.40 (34.82) |
| 4.00 (10.16) | 2.56 (6.50) | 0.72 (1.83) | 29.90 (44.50) |
| 4.50 (11.43) | 2.75 (6.99) | 0.88 (2.22) | 41.10 (61.16) |
| 5.00 (12.70) | 3.00 (7.62) | 1.00 (2.54) | 50.10 (74.56) |
| 5.50 (13.97) | 3.38 (8.59) | 1.06 (2.70) | 57.80 (86.02) |
| 6.63 (16.83) | 4.50 (11.43) | 1.06 (2.70) | 71.30 (106.11) |

In some embodiments, the tube body 132 may be formed of AISI 1340 alloy steel, and the first and second tool joints 134 and 136 may be formed of an AISI 41XX series alloy steel. Examples of such AISI 41XX series alloy steels include, but are not limited to, AISI 4145, AISI 4137, AISI 4135, AISI 4140, AISI 4142, AISI 4147, and combinations thereof.

The first and second tool joints 134 and 136 may be welded to tube body 132 using any suitable welding technique, including, but not limited to friction welding, inertia welding, submerged arc welding, or combinations thereof.

Figures 1, 3:
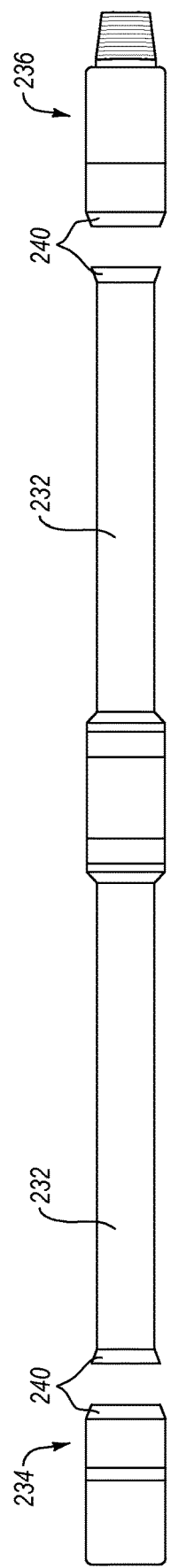
Figures 2, 3:
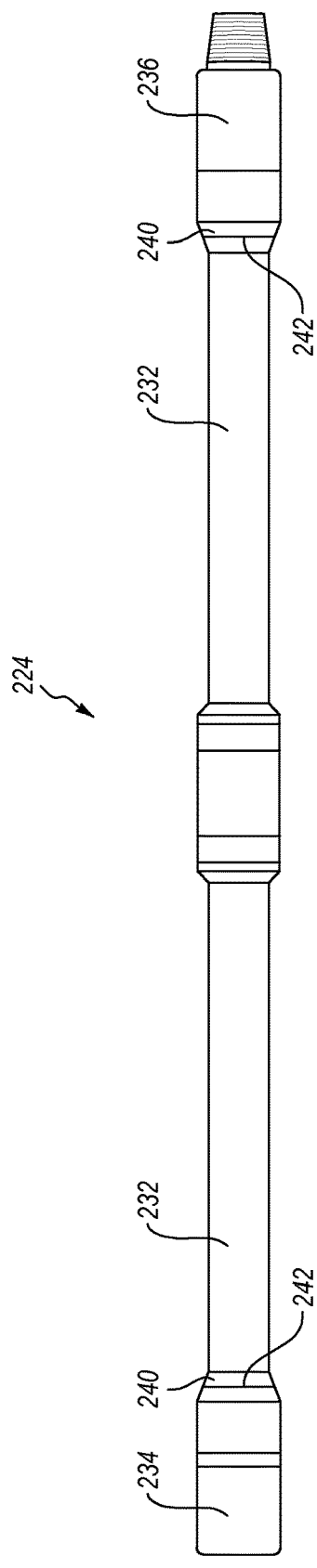

FIG. 3-1 illustrates tube body 232 when separate from the first and second tool joints 234 and 236 (e.g., prior to welding the first and second tool joints 234 and 236 to tube body 232 to form heavy weight drill pipe 224). As shown, the first tool joint 234 (or second tool joint 236) may be welded to the tube body 232 on the tapered portion 240, resulting in a weld line 242, as seen in FIG. 3-2. In some embodiments, the welding process may form the tapered portion 240. Welding on the tapered portion 240 may increase the surface area associated with the weld line 242 as compared to embodiments where the weld is formed on either side of tapered portion 240. Such increased surface area may aid in increasing one or more of the load bearing, strength, or toughness characteristics at the location of the weld. In particular, upon a welding a tool joint to a tube body, the weld line and weld region may initially have lower mechanical strength and/or toughness characteristics than the rest of the tool joint and than the tube body. Increased load bearing, strength, or toughness characteristics may be desired where, for example, the weld region would otherwise be weaker than the tube body 232 and the first and second tool joints 234, 236, at least initially, particularly when using low cost steel alloys for the tube body (e.g., AISI 1340).

The weld region refers to the weld line 242, and adjacent portions of the tube body 232 and the appropriate first or second tool joint 234 or 236, which weld region may be a heat affected zone as a result of the weld. For example, the weld region may in some embodiments be considered to extend 0.2 in. (5 mm) on either side of the weld line 242. According to some embodiments of the present disclosure, this weld region (e.g., surrounding the weld line 242) may have any combination of load bearing, strength, or toughness characteristics. In some embodiments, such characteristics may equal or exceed those of at least the tube body 232, so that the weld region, particularly at weld line 242, is at least as strong as the tube body 232, which is adjacent to the weld region. Such may be achieved through heat treatment of the weld line 242 and its surrounding weld region, as described herein.

Figure 4:
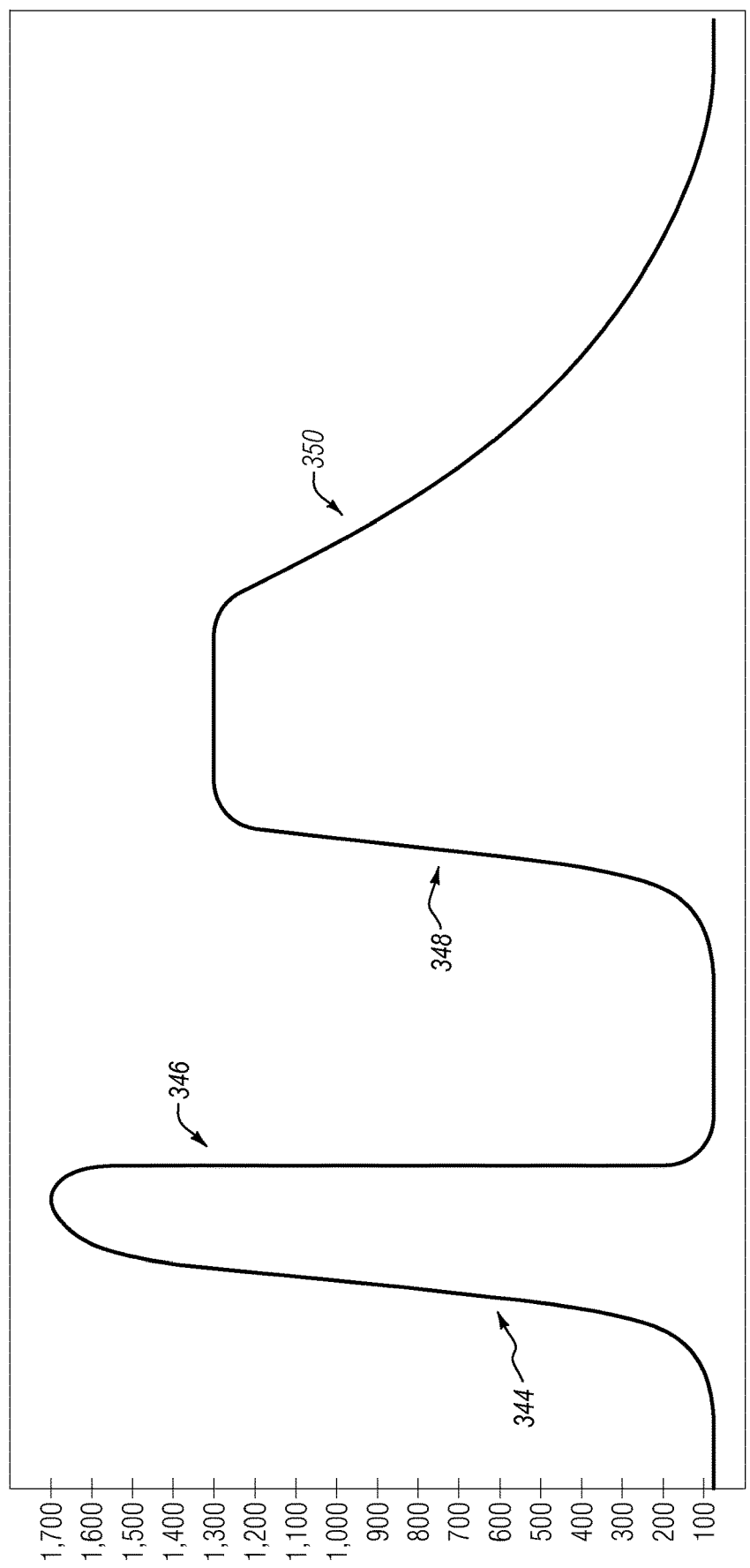
FIG. 4 is a graph showing an example heat treatment that may be applied to drill pipe, according to one or more embodiments of the present disclosure.

The weld line 242 and its surrounding weld region after welding, and subsequent to stress relief treatment, without further heat treatment, may be the location of the heavy weight drill pipe exhibiting the lowest strength and toughness characteristics. The present inventors have discovered that the strength and toughness of the weld line 242 and its surrounding weld region, can be improved, sometimes to a surprisingly dramatic extent, by austenitizing, quenching, and tempering the weld line 242 and surrounding weld region. FIG. 4 illustrates how such a heat treatment process may be carried out, with the x-axis representing time, and the y-axis representing temperature in degrees Fahrenheit. For example, after welding is performed, the weld line and at least its surrounding weld region may be heated at 344 to a temperature sufficient to austenitize the material of the weld line and surrounding weld region. In some embodiments, the heat-treated area may be larger than the weld region. For example, the distance on both sides of the weld line that may be heat-treated may be within a range having lower and/or upper limits including one or more of 0.2 in. (5 mm), 0.3 in. (8 mm), 0.4 in. (10 mm), 0.6 in. (15 mm), 1 in. (25 mm), 1.2 in. (30 mm), 1.5 in. (38 mm), or any value or range of values therebetween. In other embodiments, the heat treatment may affect a region that is less than 0.2 in. (5 mm) or more than 1.5 in. (38 mm) on either side of the weld line. If desired, a stress relief heat treatment may be applied to the weld line and surrounding weld region after welding, and before austenitizing. In some embodiments, the weld line and weld region may be heated to an austenitizing temperature within a range including lower and/or upper limits including one or more of 1,550° F. (843.5° C.), 1,575° F. (857.0° C.), 1,600° F. (871.0° C.), 1,625° F. (885.0° C.), 1,630° F. (888.0° C.), 1,640° F. (893.5° C.), 1,650° F. (899.0° C.), 1,660° F. (904.5° C.), 1,670° F. (910.0° C.), 1,675° F. (913.0° C.), 1,680° F. (915.5° C.), 1,690° F. (921.0° C.), 1,700° F. (926.5° C.), 1,710° F. (932.0° C.), 1,720° F. (938.0° C.), 1,725° F. (940.5° C.), 1,730° F. (943.5° C.), 1,740° F. (949.0° C.), 1,750° F. (954.5° C.), or any values therebetween. In other embodiments, the weld region may be heated to an austenitizing temperature above 1,750° F. (954.5° C.) or below 1,550° F. (843.5° C.).

In FIG. 4, the heat treatment at 344 is shown to reach up to 1,700° F. (926.5° C.), although such temperature (e.g., the austenitizing temperature may be varied as discussed herein). During performance of the heat treatment at 344 (e.g., by heating to the austenitizing temperature), sufficient soak time may be provided for the material of the weld line and weld region to fully or partially reach the desired austenitizing temperature. Such soak time at the austenitizing temperature may be, for instance, within a range of 1 to 10 minutes, 2 to 8 minutes, 5 to 8 minutes, or any value or range of values therebetween. In other embodiments, the soak time at the austenitizing temperature may be less than 1 minute or more than 10 minutes. Following soaking, the weld line and surrounding weld region may be quenched at 346. Quenching at 346 may be achieved by applying a quenchant, such as, but not limited to, water, brine, or a synthetic quenchant (e.g., oil) to the weld line and surrounding weld region. The quenchant may be applied by any suitable technique, for example, by spraying, soaking, or in other manners. In some embodiments, actively quenching the weld line and surrounding weld region, rather than simply allowing the weld line and surrounding weld region to self-quench (e.g., due to air cooling and the mass of the surrounding portions of the heavy weight drill pipe that may not be heated) may limit carburization or other alteration of the surface, by which carbon or other environmental contaminants may be absorbed into the exterior surface of the weld line or surrounding weld region. Absorption of such contaminants may render the surface undesirably brittle in some embodiments.

In some embodiments of the present disclosure, quenching may transform the austenite to martensite, although at this stage the martensite may be in an untempered state. At 348, the weld line and surrounding weld region may again be heated, this time to a tempering temperature that is optionally lower than the austenitizing temperature. For example, FIG. 4 illustrates a tempering temperature of 1,300° F. (704.5° C.), although the tempering temperature may vary by, for instance, being within a range including lower and/or upper limits including one or more of 1,200° F. (649.0° C.), 1,220° F. (660.0° C.), 1,250° F. (676.5° C.), 1,260° F. (682.0° C.), 1,270° F. (688.0° C.), 1,275° F. (690.56° C.), 1,280° F. (693.5° C.), 1,290° F. (699.0° C.), 1,300° F. (704.5° C.), 1,305° F. (707.0° C.), 1,310° F. (710.0° C.), 1,320° F. (715.5° C.), 1,325° F. (718.5° C.), 1,350° F. (732.0° C.), or any value or range of values therebetween. In other embodiments, the tempering temperature may be less than 1,200° F. (649.0° C.) or more than 1,350° F. (732.0° C.).

During tempering at 348, a sufficient soak time may be provided for the material of the weld line and surrounding weld region to fully or partially reach the desired tempering temperature. The soak time may be, for instance, between 1 and 10 minutes, 2 and 8 minutes, or 5 and 8 minutes, although the soak time may be less than 1 minute or more than 10 minutes in other example embodiments. As shown in FIG. 4, the soak time following tempering at 348 may be greater than the soak time following heat treating at 344. For instance, the soak time following tempering at 348 may be between two and five times longer than the soak time following heat treating at 344. In other embodiments, however, the soak time following tempering may be less than two, or more than five, times the soak time following heat treating at 344. In some embodiments, the soak time following heat treating at 344 may be greater than the soak time following tempering at 348. After tempering at 348, the weld line and surrounding weld region may be cooled at 350 (e.g., back to ambient temperature). Cooling may occur through natural cooling in air (e.g., self-quenching as shown), by actively applying a quenchant (e.g., to obtain a cooling rate similar to quenching shown at 346) or in other manners.

The heating applied to the weld line and surrounding weld region (e.g., during austenitizing and/or tempering) may be applied by any suitable technique. In some embodiments, heat is applied in either or both of austenitizing or tempering by induction heating. For example, the weld line and surrounding weld region may be positioned within an induction coil, and the induction coil may be used to heat the weld line and surrounding weld region to the desired temperature. As a result, the entire heavy weight drill pipe may not be heated. Of course, the entire heavy weight drill pipe could potentially be heated during either or both of austenitizing or tempering.

The austenitizing, quenching, and tempering in embodiments of the present disclosure has been found by the inventors to dramatically increase the strength (e.g., yield strength and/or tensile strength), and/or toughness (e.g., Charpy impact toughness at −4° F. (−20° C.) of the weld line and surrounding weld region of a tool joint. For example, in some embodiments, the weld line (e.g., weld line 242) and/or surrounding weld region may have a Charpy impact toughness within a range including lower and/or upper limits that include one or more of 12 ft-lbs. (16.5 N-m), 13 ft-lbs. (17.5 N-m), 15 ft-lbs. (20.5 N-m), 18 ft-lbs. (24.5 N-m), 20 ft-lbs. (27.0 N-m), 24 ft-lbs. (32.5 N-m), 25 ft-lbs. (34.0 N-m), 30 ft-lbs. (40.5 N-m), 40 ft-lbs. (54.0 N-m), or any value or range of values therebetween. In other embodiments, the Charpy impact toughness may be less than 12 ft-lbs. (16.5 N-m) or more than 40 ft-lbs. (54.0 N-m).

In some embodiments, a weld line and/or surrounding weld region may have a yield strength within a range having lower and/or upper limits including one or more of 65 ksi (448.0 MPa), 70 ksi (482.5 MPa), 75 ksi (517.0 MPa), 80 ksi (551.5 MPa), or any value or range of values therebetween. In other embodiments, the weld line 242 and/or surrounding weld region may have a yield strength less than 65 ksi (448.0 MPa) or greater than 80 ksi (551.5 MPa).

In some embodiments, a weld line and/or surrounding weld region may have a tensile strength within a range having lower and/or upper limits including one or more of 106 ksi (731.0 MPa), 107 ksi (737.5 MPa), 108 ksi (744.5 MPa), 109 ksi (751.5 MPa), 110 ksi (758.5 MPa), 111 ksi (765.5 MPa), 112 ksi (772.0 MPa), 115 ksi (793.0 MPa), or any value or range of values therebetween. In other embodiments, such a tensile strength may be less than 106 ksi (731.0 MPa) or greater than 115 ksi (793.0 MPa).

In some embodiments, a heat treatment may provide a weld line and/or surrounding weld region with a tensile strength value that is substantially equal to or greater than that of the tube body coupled to the tool joint at the weld line. In some embodiments, the increase in tensile strength as a result of heat treatment may be 1%, 2%, 3%, 4%, 5%, 6%, or more, or any value, or range of values therebetween. Such increase may be relative to the weld line prior to heat treatment and/or relative to the tube body. In some embodiments, there may be greater than a 5% increase in tensile strength, or less than a 1% increase in tensile strength. The heat treatment may provide the weld line and/or surrounding weld region with a yield strength value that is substantially equal to or greater than that of the tube body. In some embodiments, the increase in yield strength may be, within a range having lower and/or upper limits including one or more of 5%, 10%, 15%, 20%, 25%, 30%, 35%, or any value, or range of values therebetween. Such increase may be relative to the weld line prior to the heat treatment and/or relative to the tube body. In some embodiments, there may be greater than a 35% increase in yield strength, or less than a 5% increase in yield strength.

In some embodiments, Charpy impact toughness may increase as a result of the heat treatment. For instance, the Charpy impact toughness at the weld line and/or surrounding weld region may be substantially equal to that of the tube body (e.g., tube body 232), or greater than that of the tube body. In some embodiments, the increase in Charpy impact toughness may be within a range including lower and/or upper limits including one or more of 15%, 30%, 35%, 40%, 45%, 50%, 55%, 60%, 65%, 70%, 75%, 80%, 90%, 100%, 125%, 150%, 200%, 250%, 300%, 400% or any value, or range of values therebetween. Such increase may be relative to the weld line prior to the heat treatment or relative to the tube body. In other embodiments, there may be greater than a 400% increase in Charpy impact toughness, or less than a 15% increase in Charpy impact toughness.

Example compositional characteristics of AISI 1340 and AISI 4145 modified alloy steels are shown in Table 2.

TABLE 2

| Element | Content (wt %) | |
| --- | --- | --- |
| | AISI 4145 Modified Bar | AISI 1340 Tube |
| C | 0.38-0.48 | 0.38-0.43 |
| Mn | 1.00-1.30 | 1.60-1.90 |
| Cr | 1.00-1.30 | — |
| Mo | 0.25-0.45 | — |
| Si | 0.15-0.35 | 0.15-0.35 |
| P | 0.015 max | 0.015 max |
| S | 0.010 max | 0.010 max |
| Fe | Balance | Balance |

Comparative testing was conducted in order to illustrate the increased strength and/or toughness characteristics in a weld line (e.g., weld line 242) and surrounding weld region provided by some embodiments of the present disclosure. A summary of the conducted testing data (as measured on the weld line of the weld region) is presented in Table 3.

TABLE 3

| Sample | Tensile Strength ksi (MPa) | Yield Strength ksi (MPa) | Charpy Impact Toughness at −4° F. ft-lbs. (N-m) |
| --- | --- | --- | --- |
| Conventional (Control) | 104.6 (721.2) | 62.0 (427.5) | 17.4 (23.6), 23.0 (31.2), 7.6 (10.3) |
| Example 1 | 111.5 (768.8) | 80.3 (553.7) | 14.5 (19.7), 21.1 (28.6), 32.4 (43.9) |
| Example 2 | 109.5 (755.0) | 80.3 (553.7) | 30.2 (40.9), 43.3 (58.7), 50.6 (68.6) |

Each of the samples included a tube body formed of normalized AISI 1340 alloy steel, and first and second tool joints formed of AISI 4145 modified alloy steel. The first and second tool joints had been quenched and tempered prior to being welded to the tube body. The first and second tool joints of each sample were welded to the tube body by inertia welding, and the weld line was heat treated in accordance with embodiments disclosed herein. In the tested samples, the tensile strength of the AISI 1340 tube body was 109.8 ksi (757.0 MPa), the yield strength of the tube body was 66.4 ksi (457.8 MPa), and the Charpy impact toughness at −4° F. (−20° C.) was 22.2 ft-lbs. (30.1 MPa), 27.0 ft-lbs. (36.6 MPa), and 19.6 ft-lbs. (26.6 N-m). The three different values of Charpy impact toughness represent three tested samples. The weld line in each sample may not be perpendicular to the longitudinal axis of the tested sample, although the Charpy sample notch may be perpendicular to the longitudinal axis of the tested sample, thus explaining at least some of the variability in the data. The Charpy sample notch type and size were in accordance with full size, V-notch samples per ASTM A370.

The yield strength and Charpy impact toughness characteristics of the weld line and surrounding weld region prior to heat treatment may be lower than those of the tube body (e.g., formed of normalized 1340 AISI alloy steel). After heat treatment (i.e., austenitizing, quenching, and tempering), the yield strength and Charpy impact toughness of the weld line and surrounding weld region may be substantially equal to, or exceed that of, the tube body. For example, the yield strength of the tube body of the samples tested as described herein was 66.4 ksi (457.8 MPa), while the yield strength at the weld line increased from 62.0 ksi (427.5 MPa) to 80.3 ksi (553.7 MPa), in both Examples 1 and 2. This represents a 30% increase in yield strength. The Charpy impact toughness characteristics of the tube body of the samples tested as described herein were 22.2 ft-lbs. (30.1 N-m), 27.0 ft-lbs. (36.6 N-m), and 19.6 ft-lbs. (26.6 N-m) respectively, while the Charpy impact toughness at the weld line increased from a low value of 7.6 ft-lbs. (10.3 N-m) to a low value of 14.5 ft-lbs. (19.7 N-m) in Example 1, and a low value of 30.2 ft-lbs. (40.9 N-m) in Example 2. This represents an increase of 91% in Example 1, and an increase of 297% in Example 2. In Example 1, the increase in Charpy impact toughness provides the weld line and/or surrounding weld region with comparable values to that of the tube body, while in Example 2, the increase provides the weld line and/or surrounding weld region with impact toughness values that are significantly higher than that of the tube body (e.g., the low value of 30.2 ft-lbs (40.9 N-m) for the weld region is 54% higher than the low value of 19.6 ft-lbs. (26.6 N-m) for the tube body).

Both Examples 1 and 2 were austenitized by heating the weld region to 1,700° F. (927° C.). The examples differed from one another in that Example 1 was tempered at a temperature of 1,270° F. (688° C.) and Example 2 was tempered at a temperature of 1,305° F. (707° C.). These results demonstrated that austenitizing, quenching, and tempering of the weld line and surrounding weld region is able to increase the strength and toughness characteristics of the weld region. Such results are particularly surprising considering the inventors' past experiences in heat treating AISI 1340 alloy steel tube bodies. One having ordinary skill in the art will also appreciate such results to be noteworthy as customers of heavy weight drill pipe may request certain mechanical properties of tube bodies, but they do not specify the mechanical properties of welds.

Although the tube body may be principally described herein as being formed of AISI 1340 alloy steel, it will be appreciated that in some embodiments, the tube body may be formed of a different alloy steel (e.g., one also exhibiting lower strength and/or toughness characteristics than the material of the first and second tool joints attached thereto, when the tube body is in a normalized condition, or the same material as the first and/or second tool joints). Austenitizing, quenching, and tempering as described herein can increase the strength and/or toughness of the weld line and surrounding weld region. In some embodiments, such heat treatment may raise the strength and/or toughness characteristics of the weld line and surrounding weld region so as to be substantially equal to or greater than those of the tube body. In some embodiments, heat treatment may be used to allow a tube body of a lower cost material (e.g., AISI 1340 alloy steel) to be used and meet mechanical property specifications without changing to a higher cost material (e.g., AISI 4145 (or 41XX series) modified alloy steel).

Various embodiments of the present disclosure have been described and illustrated herein. These embodiments are examples of presently disclosed techniques. In an effort to provide a concise description of these embodiments, some features of an actual embodiment have been described while other features or components within the knowledge of a person having ordinary skill in the art may have been omitted. It should be appreciated that in the development of any commercial embodiment, as in any engineering or design project, numerous embodiment-specific decisions will be made to achieve the developers' specific goals, such as compliance with system-related and business-related constraints, which may vary from one embodiment to another. It should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. It should be understood that references to "one embodiment" or "an embodiment" of the present disclosure are not intended to be interpreted as excluding the existence of additional embodiments that also incorporate the recited features.

Numbers, percentages, ratios, or other values stated herein are intended to include that value, and also other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Furthermore, the term "substantially" as used herein represents an amount close to the stated amount that still performs a desired function or achieves a desired result. For example, the term "substantially" may refer to an amount that is within 5% of, within 1% of, within 0.1% of, and within 0.01% of a stated amount or value.

Unless otherwise stated, amounts listed in percentages are weight percent. Where multiple values are provided for a lower and/or upper limit to a range, this should be interpreted that any value may be an upper limit (e.g., up to 50%, or no greater than 50%), a lower limit (at least 50% or greater than 50%), or two values may provide lower and upper limits within a range. Endpoints of a range are included unless expressly disclaimed (e.g., between 40% and 60%).

As used herein, relational terms such as "distal," "proximal," "uphole," "downhole," and other like terms as used herein refer to relative positions to one another and are not intended to denote a particular direction or spatial orientation. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of manufacturing a pipe, the method comprising:
   welding a first tool joint formed of AISI 41XX series alloy steel to a first end of a tube body formed of AISI 1340 alloy steel;
   welding a second tool joint formed of AISI 41XX series alloy steel to a second end of the tube body; and
   heat treating (i) at least one of a first weld line or a first weld region surrounding the first weld line, located between the first tool joint and the first end of the tube body, and (ii) at least one of a second weld line or a second weld region surrounding the second weld line, located between the second tool joint and the second end of the tube body, the heat treating including:
   austenitizing the first and second weld lines or the first and second weld regions by heating the first and second weld lines or the first and second weld regions, but not an entirety of the pipe, to an austenitizing temperature of at least 1,550° F. (843.5° C.);

following austenitizing, actively quenching the first and second weld lines or the first and second weld regions from the austenitizing temperature to a quenching temperature that is approximately ambient temperature; and after quenching, tempering the first and second weld lines or the first and second weld regions by heating the first and second weld lines or the first and second weld regions, but not the entirety of the pipe, to a tempering temperature of at least 1,200° F. (649.0° C.).

2. The method of claim 1, wherein austenitizing the first and second weld lines or the first and second weld regions includes austenitizing for an austenitizing soak time of between 1 and 10 minutes.

3. The method of claim 1, wherein tempering the first and second weld lines or the first and second weld regions includes tempering for a tempering soak time of between 1 and 10 minutes.

4. The method of claim 1, wherein austenitizing the first and second weld lines or the first and second weld regions includes austenitizing for an austenitizing soak time of between 1 and 10 minutes and tempering the first and second weld lines or the first and second weld regions includes tempering for a tempering soak time that is between two and five times the austenitizing soak time.

5. A method of manufacturing a pipe, the method comprising:

welding a first tool joint formed of AISI 41XX series alloy steel to a first end of a tube body formed of AISI 1340 alloy steel;

welding a second tool joint formed of AISI 41XX series alloy steel to a second end of the tube body; and heat treating (i) at least one of a first weld line or a first weld region surrounding the first weld line, located between the first tool joint and the first end of the tube body, and (ii) at least one of a second weld line or a second weld region surrounding the second weld line, located between the second tool joint and the second end of the tube body, the heat treating including:

austenitizing the first and second weld lines or the first and second weld regions by heating the first and second weld lines or the first and second weld regions, but not an entirety of the pipe, to an austenitizing temperature of at least 1,550° F. (843.5° C.);

quenching with a quenchant the first and second weld lines or the first and second weld regions following austenitizing to a quenching temperature that is approximately ambient temperature, the quenchant including one of water, brine, or synthetic quenchant; and after quenching, tempering the first and second weld lines or the first and second weld regions by heating the first and second weld lines or the first and second weld regions, but not the entirety of the pipe, to a tempering temperature of at least 1,200° F. (649.0° C.).

6. The method of claim 5, the austenitizing temperature being at least 1,600° F. (871.0° C.).

7. The method of claim 5, the austenitizing temperature being at least 1,650° F. (899.0° C.).

8. The method of claim 5, the austenitizing temperature being from 1,675° F. (913.0° C.) to 1725° F. (940.5° C.).

9. The method of claim 5, the tempering temperature being between 1,220° F. (660.0° C.) and 1,325° F. (718.5° C.).

10. The method of claim 5, the tempering temperature being between 1,270° F. (688.0° C.) and 1,305° F. (707.0° C.).

11. The method of claim 5, at least one of the first weld line, first weld region, second weld line, or second weld region having a Charpy impact toughness after the heat treating of at least 12 ft-lbs (16 N-m) at −4° F. (−20° C.).

12. The method of claim 5, at least one of the first weld line, first weld region, second weld line, or second weld region having a Charpy impact toughness after the heat treating of at least 24 ft-lbs. (32.5 N-m) at −4° F. (−20° C.).

13. The method of claim 5, at least one of the first or second tool joints being from AISI 4137 alloy steel.

14. The method of claim 5, wherein austenitizing the first and second weld lines or the first and second weld regions includes austenitizing for an austenitizing soak time of between 1 and 10 minutes.

15. The method of claim 5, wherein tempering the first and second weld lines or the first and second weld regions includes tempering for a tempering soak time of between 1 and 10 minutes.

16. The method of claim 5, wherein tempering the first and second weld lines or the first and second weld regions includes tempering for a tempering soak time that is between two and five times an austenitizing soak time.

17. A method of manufacturing a pipe, the method comprising:

welding a first tool joint formed of AISI 41XX series alloy steel to a first end of a tube body formed of AISI 1340 alloy steel on a tapered portion between the tube body and the first tool joint;

welding a second tool joint formed of AISI 41XX series alloy steel to a second end of the tube body on a tapered portion between the tube body and the second tool joint; and heat treating (i) at least one of a first weld line or a first weld region surrounding the first weld line, located between the first tool joint and the first end of the tube body, and (ii) at least one of a second weld line or a second weld region surrounding the second weld line, located between the second tool joint and the second end of the tube body, the heat treating including:

austenitizing the first and second weld lines or the first and second weld regions by heating the first and second weld lines or the first and second weld regions to an austenitizing temperature of at least 1,550° F. (843.5° C.), an induction coil being used to heat the first and second weld lines or the first and second weld regions to the austenitizing temperature, but not an entirety the tube body;

actively quenching the first and second weld lines or the first and second weld regions following austenitizing to a quenching temperature that is approximately ambient temperature; and after quenching, tempering the first and second weld lines or the first and second weld regions by heating to a tempering temperature of at least 1,200° F. (649.0° C.), the induction coil being used to heat the first and second weld lines or the first and second weld regions to the tempering temperature.

18. The method of claim 17, wherein heat treating increases a tensile strength of the first and second weld lines or the first and second weld regions by between 1% and 6% relative to the tensile strength of the first and second weld lines or the first and second weld regions prior to heat treating.

19. The method of claim 17, wherein heat treating increases a Charpy impact toughness of the first and second weld lines or the first and second weld regions by between 15% and 400% relative to the Charpy impact toughness of the first and second weld lines or the first and second weld regions prior to heat treating.

20. The method of claim 17, wherein after heat treating a weld tensile strength and a weld Charpy impact toughness of the first and second weld lines or the first and second weld regions are greater than a body tensile strength and a body Charpy impact toughness of the tube body.

* * * * *